March 20, 1962     E. A. COATES     3,026,066

COMBINATION LAND AND AIR VEHICLE

Filed Oct. 19, 1959     2 Sheets-Sheet 1

INVENTOR.
EUGENE A. COATES
BY
ATTORNEY

March 20, 1962 E. A. COATES 3,026,066
COMBINATION LAND AND AIR VEHICLE
Filed Oct. 19, 1959 2 Sheets-Sheet 2
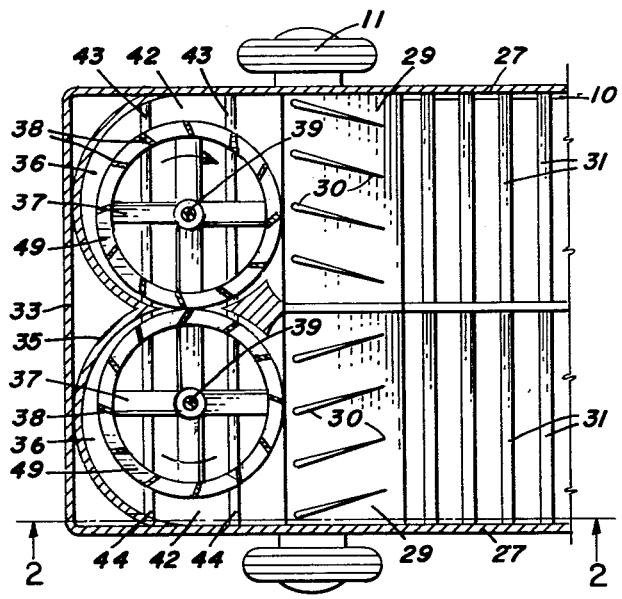
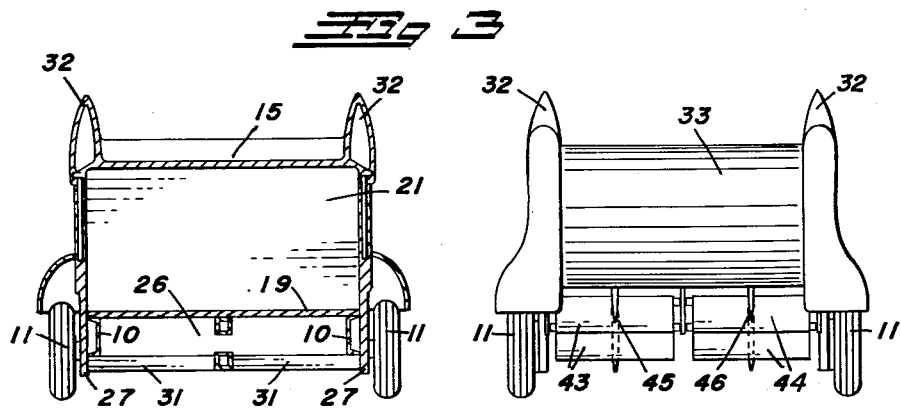
INVENTOR.
EUGENE A. COATES
BY
ATTORNEY 3,026,066
Patented Mar. 20, 1962

3,026,066
COMBINATION LAND AND AIR VEHICLE
Eugene A. Coates, Boulder, Colo.
(7 Clonard Ave., Gardenvale S.4, Victoria, Australia)
Filed Oct. 19, 1959, Ser. No. 847,279
9 Claims. (Cl. 244—12)

This invention relates to an aircraft and, more particularly, to a combination land and air vehicle of a type which will be herein designed as an "aerocar." The invention has for its principal object the provision of a vehicle which will be capable of traveling upon roadways and streets similarly to a conventional automotive vehicle and which will also be capable of guided flight in the air.

Another object of the invention is to provide an aerocar which will create a large volume, high velocity, low pressure layer of air over an airfoil to obtain low pressure areas to create maximum lifting effects upon the vehicle without the use of high forward speeds, projecting wings, whirling copter blades, etc.

Other objects and advantages reside in the detail construction of the invention which will become more apparent from the following description.

While a specific form of the invention is described and illustrated herein, it is to be understood that the same may be varied within the basic principle of this invention. It is known that a body, such as a cylinder, rotating in an air stream, will exert lift. Since it would not be practical to rotate the body of the craft or vehicle, this invention contemplates obtaining similar results by forcibly rotating an air stream about a non-rotating body. In simple words by pumping air in a vortex completely and continuously around an airfoil body to form an area of reduced pressure over the body to obtain atmospheric lift. It also contemplates drawing additional air into the pumped or forced vortex air stream from the atmosphere and discharging portions of the vortex stream for additional lifting and controlling purposes.

In the following detailed description of the invention, reference is had to the accompanying drawings which form a part hereof. Like numerals refer to like parts in all views of the drawings and throughout the description.

Figure 1:
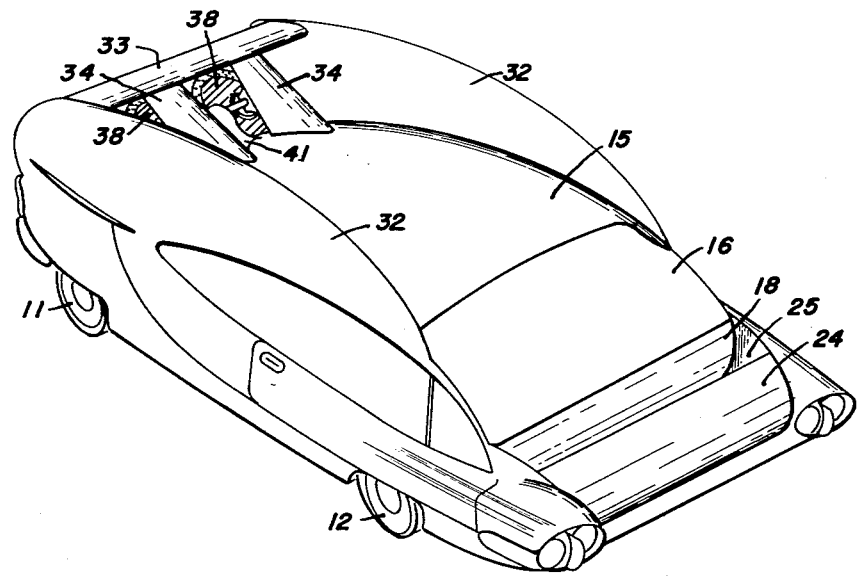
Figure 2:
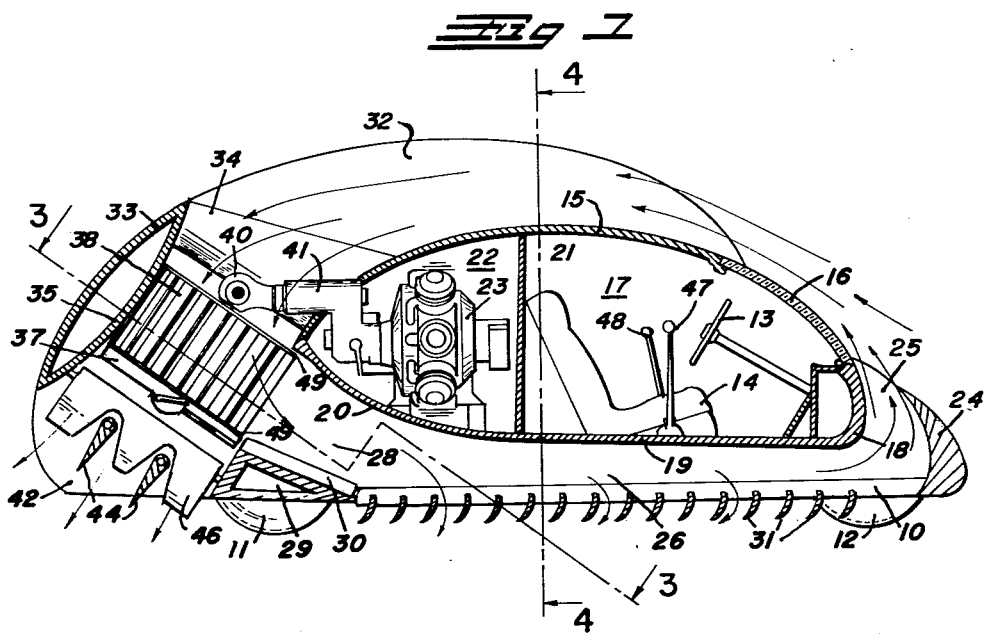

In the drawings:
FIG. 1 is a perspective view of a vehicle constructed in accord with this invention;
FIG. 2 is a longitudinal section through the aerocar taken on the line 2—2, FIG. 3;
FIG. 3 is an angular longitudinally tilted cross section looking downwardly and rearwardly on the line 3—3, FIG. 2;
FIG. 4 is a cross section on a reduced scale taken on the line 4—4, FIG. 2; and
FIG. 5 is a similarly reduced rear end view of the aerocar.

The vehicle as illustrated comprises a suitable chassis frame 10 supported at its rear extremity upon rear wheels 11 and at its forward extremity upon front wheels 12. Either the rear wheels 11 or the front wheels 12 may be mechanically power driven by any suitable means as is usual in the automotive arts. The front wheels 12 can also be provided with any conventional ground steering linkage, such as used on present day automobiles, controlled from a steering wheel 13 positioned forwardly of a pilot's seat 14. The mechanical land driving and steering mechanism may be any of the conventional types and since they form no part of the present invention, they have been omitted from the drawings for the sake of simplification.

This invention relates more particularly to providing a land automotive vehicle with means for airflight so that the vehicle may be used for either land or air travel.

This is accomplished by providing a body having a roof 15 and a windshield 16 of a continuous airfoil shape over a pilot's compartment 17. The windshield 16 connects with a rounded forward leading edge portion 18. A flat floor portion 19 extends rearwardly from the lower edge of the rounded forward leading edge portion 18 below the pilot's compartment 17 and terminates at its rear extremity in an upwardly rounded rear floor portion 20 which integrally joins the rear of the roof 15.

The roof 15, the windshield 16, the leading edge portion 18, the flat floor portion 19 and the rear floor portion 20 are all transversally straight and longitudinally curved to present a streamlined airfoil which forms the body for the aerocar. A suitable transverse partition 21 divides the pilot's compartment 17 from a rear engine compartment 22 containing any suitable power plant or engine 23.

A longitudinally-stream-lined and transversally straight nose piece 24 is positioned forwardly of and below the leading edge portion 18 to form an upwardly and rearwardly directed forward air discharge slot 25. The nose piece extends downwardly below the floor portion 19 to form the forward terminal of a bottom air passage 26 extending longitudinally below the floor portions 18 and 19. The bottom air passage 26, extends the full width of the vehicle, between side plates 27 and communicates from a rear air supply throat 28. The supply throat 28 extends transversally of the vehicle above an air directing member 29, of triangular cross section. The air directing member 29 extends horizontally completely across the vehicle and is formed with a forwardly and downwardly directed upper surface which is preferably provided with a plurality of air distributing fins 30 arranged to insure an even distribution of air across the full width of the air passage 26.

The bottom of the air passage 26 is open between the front nose piece 24 and the rear air directing member 29 and a plurality of spaced-apart, adjustable air deflecting louvers 31 extend transversally thereof in a common horizontal plane. Each of the louvers 31 is streamlined in cross section so as to present a minimum of air resistance and each is laterally curvated so as to be capable of deflecting a portion of the air flowing forwardly in the bottom air passage 26 downwardly beneath the vehicle. The angle of deflection of the air streams discharging between the louvers can be controlled by means of suitable conventional connections to a louver control lever 48 convenient to the pilot.

Side fins 32 extend upwardly at the sides of the roof 15 and continue rearwardly and downwardly to the bottom of and at the rear of the vehicle. A cross plate 33 extends between the fins 32 at the rear of the vehicle. The cross plate is preferably braced from the roof 15 by means of suitable streamlined brace struts 34. A blower housing plate 35 is mounted on or formed integrally with the cross plate 33 and is provided with two semi-cylindrical concavities 36 each of which partially encloses a blower rotor. Each blower rotor comprises a plurality of radial propeller blades 37, to create axial air thrust, upon which a cylindrical cage of blower blades 38 is concentrically mounted to create a centrifugal air thrust.

The blower rotors may be mounted in any conventional manner. As illustrated, they are mounted on forwardly inclined blower shafts 39 which are rotatably mounted in bearings 40 mounted on the struts 34. The blower rotors are positioned rearwardly of the air supply throat 28 and forwardly of the concavities 36. The blower shafts 39 are driven in opposite directions by the engine 23 through the medium of any conventional suitable power transmission device 41 so as to blow air forwardly at high velocity into the bottom air passage 26 and rearwardly and downwardly through a rear discharge passage 42 between the lower rear extremities of the side fins 32 and rearwardly of the air directing member 29.

A left set of adjustable horizontal ailerons 43 are positioned in the discharge passage 42 in the air path from the propeller blades 37 of the left hand blower rotor and a similar right set of adjustable ailerons 44 are positioned in the discharge passage 42 in the air path from the propeller blades 37 of the right hand blower rotor. The sets of ailerons 43 and 44 are pivotally and independently mounted on substantially horizontal axes so that one set can be adjusted in vertical arc independently and oppositely of the other set to adjust and control the roll of the vehicle or adjusting both together for pitch control.

A left rudder 45 extends across and at right angles to the left ailerons 43 and a similar right rudder 46 extends across and at right angles to the right ailerons 44. The rudders are pivotally mounted and interconnected similarly to conventional aircraft rudders so that they can be simultaneously swung sidewardly from normally vertical positions to direct the air from the blower rotors toward either side to adjust and control the yaw of the vehicle.

The ailerons 43 and 44 are connected similarly to conventional aircraft ailerons to a universally movable control stick 47 convenient to the pilot. The connections are such that rearward movement of the stick will swing all ailerons upwardly to direct the discharging air so as to create a down load on the rear of the vehicle and forward movement of the stick will swing all ailerons downwardly to direct the discharging air so as to exert a lifting effect at the rear of the vehicle so as to provide pitch control in flight. The connections with the stick 47 are also such that sideward movement thereof will act to vary the position of one set of ailerons relative to the other set to trim the roll of the vehcile.

The rudders 45 and 46 are connected to any suitable steering mechanism in any conventional manner so as to provide proper yaw control. It is suggested that the controls of the ailerons and rudders could be combined with the steering wheel 13 and its steering column 48.

It is believed that the function and operation of the structure will be understood from the above description thereof. Briefly, let us assume that the blower rotors are operating and that the vehicle is traveling forwardly. The rotors are driving a stream of high velocity air from the blower blades 38 forwardly through the bottom air passage 26 and from the propeller blades 37 rearwardly and downwardly through the rear discharge passage 42.

The forward speed is controlled by controlling the pitch attitude so that the lift vector acts both vertically and forwardly giving both lift and thrust reaction of the rearwardly directed air streams from the rear discharge 42 and from between the louvers 31 provides additional thrust to drive the vehicle forwardly. The lift decreases and the forward speed increases as the free edges of the louvers swing upwardly and rearwardly to provide high forward speed when the cruising attitude has been reached. The vehicle is then trimmed in pitch by varying the angles of the ailerons 44 and 43 and trimmed laterally in yaw by varying the angular positions of the rudders 45 and 46 and trimmed in roll by varying the relative positions of the two sets of ailerons 43 and 44.

The high velocity air from the centrifugal effect of the blower blades 38 will flow through the bottom passage 26 and will be deflected upwardly rearwardly by the nose piece 24 over the airfoil curvature of the windshield and roof between the side fins 32 and back to the blower rotors. This forced stream of air circulates in high velocity vortex completely about the body and draws in air from the atmosphere to replace the air being discharged downwardly so as to create an extremely large volume of high velocity low pressure air over the upper surface of the body to create a relatively high vacuum substantially over the center of gravity to create atmospheric lift upon the vehicle. The volume of air flowing over the airfoil curvature is still further increased by forward motion of the body. The forward motion being created on the ground by the mechanical drive and in the air by the rearwardly and downwardly directed air currents.

At a 50 m.p.h. forward speed, the lift created would approximate the results of the following equations in which $V_o$ is the forward velocity, $V_t$ is the velocity over the roof, $r$ is the radius of curvature of the roof, $b$ is the width of the roof, and $p$ is the air density.

(1) $$L = b\rho V.\Gamma \ ; \ \Gamma = 2\pi r V_t$$
$$\therefore L = 2\pi r b \rho V_t V_o$$

Assuming $r=5$ ft., $V_t=70$ m.p.h., $V_o=50$ m.p.h., and $b=6$ ft. the $L$ (the lift) $=3400$ lbs.

With no forward velocity and with an air velocity over the roof ($V_t$) of 170 m.p.h. from $L=\text{Vol.}\ (V_t^2/r)$ the lift $(L)=3700$ lbs.

The above are more or less approximate but they do serve to show that the structure will produce usable lift. Experiments have indicated that the forced return of the air from the forward air discharge slot 25 greatly increases the lift over that obtained with the slot 25 closed.

It can be seen from the above that the basic principle of the invention, to wit, the forcibly pumping of a continuous vortex airstream about a body to obtain lift has been accomplished by the vehicle as illustrated and described.

For safety purposes in case of engine failure, the rotors are provided with relatively heavy, fly-wheel-like rims 49 so that in case of engine failure, the rotors would continue to rotate sufficiently to slow descent.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. An aircraft comprising: a body having an airfoil cross section on its flight axis and motor-driven air circulation means mounted in fixed relation to said body so as to direct an air stream forwardly beneath said body and rearwardly over said body so as to place said body in the vortex of a continuously circulating forced air flow to create an area of reduced pressure above said body, said motor driven air circulating means including a blower rotor positioned rearwardly of said body so as to intake air from the top of said body and discharge air forwardly beneath said body; a nose piece positioned forward of the leading edge of said body to receive the forwardly discharged air from beneath said body and direct it upwardly over said leading edge; and means for directing a portion of the discharge of said blower rotor rearwardly and downwardly to impart forward motion to said body.

2. An aircraft as described in claim 1 having additional directing means arranged to direct a portion of the forward discharge from said rotor downwardly from said body.

3. An aircraft as described in claim 1 having means for directing the direction of flow of the rearwardly and downwardly directed portion of the discharge of said blower rotor.

4. An aircraft as described in claim 2 having means for controlling said portion of the forward discharge from said rotor.

5. An aircraft comprising: a body having an airfoil cross section on its flight axis and motor-driven air circulation means mounted in fixed relation to said body so as to direct an air stream forwardly beneath said body and rearwardly over said body so as to place said body in the vortex of a continuously circulating forced air flow to create an area of reduced pressure above said body, said motor-driven air circulating means including a blower rotor, said blower rotor containing a first series of blades acting to force air axially of said rotor and rearwardly from said body and a second series of blades acting to force air tangentially of said rotor and forwardly beneath said body.

6. A combination land and air vehicle comprising: a chassis frame; wheels supporting said frame; an enclosed body having an airfoil-curvated top and generally flat bottom supported by said chassis; an air blower device mounted at the rear of said body and positioned to draw air rearwardly over the top of said body and creating a generally downward and rearward forced air stream at the rear thereof; motor means driving said air blower device; a side fin extending upwardly along each side of the top of said body to confine the air flowing rearwardly thereover; a longitudinally extending bottom air passage positioned below said body and receiving air under pressure from said blower device to create a forwardly moving current of air below said body; and means for diverting the forwardly moving current of air upwardly and rearwardly over the top of said body between said side fins.

7. A combination land and air vehicle as described in claim 6 having a number of transversally extending louvers mounted in the bottom of said bottom air passage and arranged to divert a portion of said forwardly moving current of air downwardly.

8. A combination land and air vehicle as described in claim 7 in which the means for diverting comprises a forward leading edge extending transversally across the forward extremity of said body above said bottom passage and a nose piece extending across said chassis forwardly of and spaced from said forward extremity to form a forward air slot therebetween, the forward surface of said forward extremity and the rear surface of said nose piece being curvated to direct air discharging from said bottom passage upwardly and rearwardly over said body.

9. An aircraft comprising: a body having an airfoil cross section on its flight axis and motor-driven air circulation means mounted in fixed relation to said body so as to direct an air stream forwardly beneath said body and rearwardly over said body so as to place said body in the vortex of a continuously circulating forced air flow to create an area of reduced pressure above said body, said motor driven air circulating means including a blower rotor positioned rearwardly of said body so as to intake air from the top of said body and discharge air forwardly beneath said body; a nose piece positioned forward of the leading edge of said body to receive the forwardly discharged air from beneath said body and direct it upwardly over said leading edge; and means for allowing a portion of the air moving forwardly beneath the body to escape downwardly to impart a lift reaction to said body.

References Cited in the file of this patent
UNITED STATES PATENTS

| | | |
|---|---|---|
| 2,388,307 | Cargill | Nov. 6, 1945 |
| 2,444,318 | Warner | June 29, 1948 |
| 2,913,196 | Cox | Nov. 17, 1959 |

FOREIGN PATENTS

| | | |
|---|---|---|
| 584,585 | Germany | Sept. 21, 1933 |